H. W. Putnam.
Bottle Stopper Fastening.
No 1606. Reissued Jan. 19 1864.
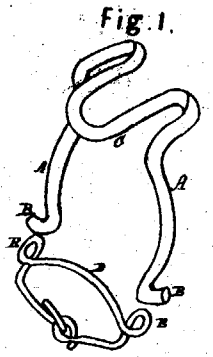
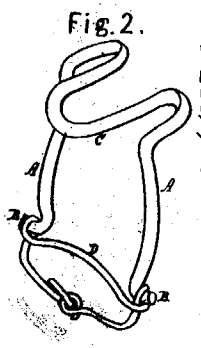
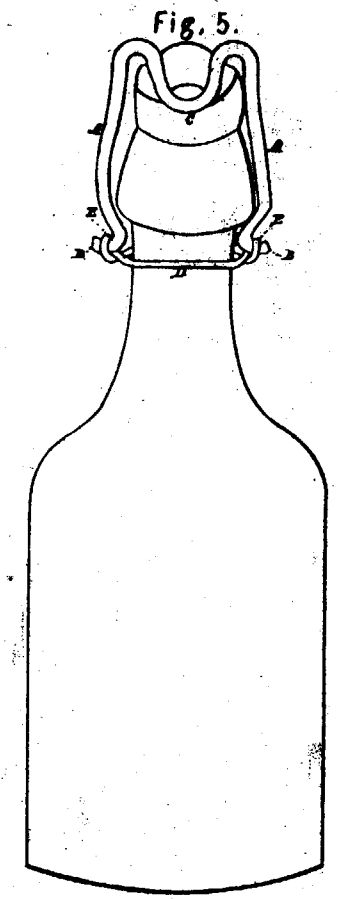
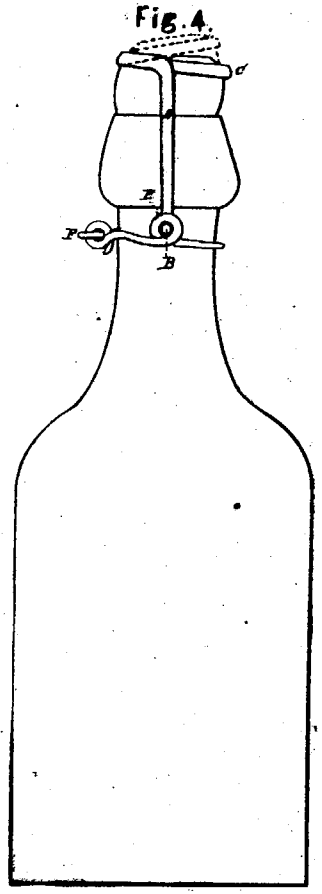
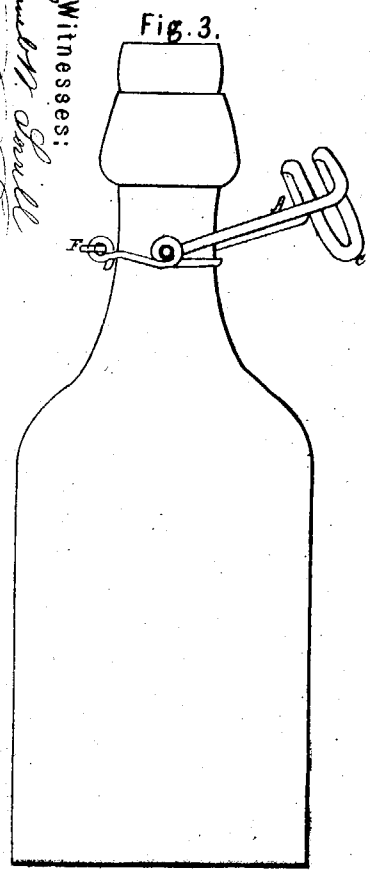
Witnesses:
Lemuel W. Serrill
Thos. Geo. Harold
Inventor:
Henry W. Putnam

UNITED STATES PATENT OFFICE.

HENRY W. PUTNAM, OF NEW YORK, N. Y.

IMPROVED BOTTLE-STOPPER FASTENING.

Specification forming part of Letters Patent No. 23,263, dated March 15, 1859; Reissue No. 1,606, dated January 19, 1864.

*To all whom it may concern:*

Be it known that I, HENRY W. PUTNAM, of the city and State of New York, formerly of Cleveland, in the county of Cuyahoga and State of Ohio, have invented certain new and useful Improvements in Fastenings for Bottle Corks and Stoppers; and I do hereby declare that the following is a full and complete description of the construction and operation of the same, reference being had to the accompanying drawings, making part of this specification.

Fastenings for bottles have heretofore been made in which a strap of metal has extended over the cork from a hinge or joint formed on each side of the neck of the bottle by a second metallic strip. This device is costly to manufacture, and is liable to be displaced in use by the pressure upon the cork, because such metal strap has had a notch formed therein for the plunger, (that holds in said cork after the bottle has been filled,) which notch allows the cork to project at this point, and by springing up the metal on the sides of the notch form an inclined plane, against which the pressure acts to force the fastener aside and relieve the cork.

The nature of my said invention consists in forming the fastener of wire bent in such a manner that if the pressure upon the cork is sufficient to bend said wire fastener it will retain the cork more firmly and the cork require to be pushed in before the fastener can be pushed aside, thus causing the pressure to render the fastening more secure instead of more liable to failure. I also form joints for securing the fastener and forming a hinge upon which it may be turned aside by bending the ends of such wires at right angles, or nearly so, to the sides of the fastener, and I make use of a wire for attaching this fastener to the bottle, in which the eyes are formed for receiving the ends of the fastener, and on which the said fastener swings, thus producing by one piece of wire a much more simple, effective, and cheap attachment than any before made.

In the accompanying drawings, Figure 1 represents the fastener with the two parts separated from each other. Fig. 2 represents the fastener with the two parts united. Fig. 3 represents the fastener with one part loosely inclosing the neck of the bottle, and Figs. 4 and 5 show different views of the fastener in use.

Similar marks of reference denote the same parts.

A represents the bent wire that embraces the stopper or cork of the bottle. This piece is made of wire that is about one-tenth of an inch in diameter, more or less, according to the strength required. The two sides A A are nearly straight, being curved a little in one direction to fit the enlargement upon the neck of the bottle. The lower ends are turned outward, as seen at B B, and in this manner forming the pin for the hinge. The middle part of this wire is bent so as to stand nearly at right angles to the sides, as seen at C, the horizontal parts being nearly parallel, and a space between being left sufficient for the piston that forces the cork into the neck of the bottle, for it will be understood that the bottles are filled under a pressure of two or three atmospheres for the purpose of holding the carbonic-acid gas in solution with which the liquid is charged.

D represents the wire that surrounds the neck of the bottle.

At E E are shown loops, into which the ends B B of the wire A are inserted, and which together form a hinge upon each side of the neck of the bottle, allowing the wire A to be turned back, as seen in Fig. 3, thus leaving the stopper free. On reference to Figs. 3 and 5 it will be seen that the wire E, at the side of the neck which comes below the part C of the fastening A, is next the bottle and passes up to form the eye for B; hence the portion of the wire which passes around on the other side of the neck comes outside at the eye. The object of this is that the fastener A may be turned easily into the position shown in Fig. 3, and if an attempt is made to turn it on the other side the wire E binds against the fastener A near the part B; hence the fastener cannot easily be turned to the wrong side, but will be in the correct position to be turned up with the U part over the cork, instead of the end C coming up against the plunger and preventing the fastening passing over the cork. This wire D, after being properly placed around the neck of the bottle, is fastened by twisting the ends together, as seen at F, Figs. 3 and 4.

The manner of using this fastening is as follows: The bottle is placed under the fountain and its neck encircled at the top by the tube that conveys the saturated water or other liquid into the bottle. The cork being placed in the tube above the side pipe that admits the fluid into the bottle, by turning a stop-cock the bottle becomes filled with the liquid, and by means of the piston above the cork the cork is forced into the neck of the bottle, the fastening being turned aside, as seen in Fig. 3. When the bottle is full and the cork inserted, the pipe is elevated, the piston still holding the cork. The fastener is then forced over the end of the cork, as seen in Figs. 4 and 5, in which position it is held from being pressed out by the expansion of the gas. It will be evident that, if the pressure of the gas in the bottle is sufficient to bend or spring the wire fastener upward, it will assume a form similar to that shown by red lines in Fig. 4, the U-shaped part will assume an inclined form with the bend *c* the highest, and the cork being swelled up in said bend, so that the wire is embedded, the cork cannot escape by acting under this incline and throwing the fastener to the left, Fig. 3; neither can the fastener escape to the right, because of the inclination itself; hence it is sometimes necessary to force in the cork before the fastener can be released, which is effected by pressing with the thumb on the sides A of the wire fastening and turning it off into the position of Fig. 3.

I do not claim a fastener of sheet metal with a U-shaped opening to pass the plunger; but

What I claim, and desire to secure by Letters Patent, is—

1. Forming the fastener at the part that comes over the cork of a piece of wire of a U form, with the ends returned and connected to the bottle, in order that the pressure on the cork or stopper may cause the fastener to hold more securely, as specified.

2. A wire fastener for a cork or stopper, in which the ends of the wire are bent nearly at right angles to form the joint or hinge on which the fastener is turned, substantially as specified.

3. Forming the eyes for the reception of the fastener by means of a wire bent as set forth.

4. A wire fastener for the stoppers of bottles, fitted so that it can be pressed aside from over the stopper, as set forth, in combination with a band or fastening attaching the same to the neck of the bottle, as specified.

Dated December 19, 1863.

HENRY W. PUTNAM.

Witnesses:

LEMUEL W. SERRELL,
THOS. GEO. HAROLD.